United States Patent
Desai et al.

(10) Patent No.: US 11,698,674 B2
(45) Date of Patent: Jul. 11, 2023

(54) MULTIMODAL INPUTS FOR COMPUTER-GENERATED REALITY

(71) Applicant: Apple Inc., Cupertino, CA (US)

(72) Inventors: Ranjit Desai, Cupertino, CA (US); Maneli Noorkami, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 17/016,190

(22) Filed: Sep. 9, 2020

(65) Prior Publication Data

US 2021/0074072 A1 Mar. 11, 2021

Related U.S. Application Data

(60) Provisional application No. 62/897,909, filed on Sep. 9, 2019.

(51) Int. Cl.
| | |
|---|---|
| *G06T 19/00* | (2011.01) |
| *G06F 9/50* | (2006.01) |
| *G06F 16/907* | (2019.01) |
| *H04N 21/433* | (2011.01) |
| *G06V 40/16* | (2022.01) |
| *G06V 40/20* | (2022.01) |
| *G06V 10/25* | (2022.01) |

(52) U.S. Cl.
CPC .......... *G06T 19/006* (2013.01); *G06F 9/5011* (2013.01); *G06F 16/907* (2019.01); *G06V 10/25* (2022.01); *G06V 40/174* (2022.01); *G06V 40/20* (2022.01); *H04N 21/4334* (2013.01)

(58) Field of Classification Search
None
See application file for complete search history.

(56) References Cited

U.S. PATENT DOCUMENTS

| | | | |
|---|---|---|---|
| 10,812,711 B2 | 10/2020 | Sapienza | |
| 10,908,694 B2 | 2/2021 | Potts | |
| 2009/0218957 A1 | 9/2009 | Kraft et al. | |
| 2013/0177296 A1 | 7/2013 | Geisner et al. | |
| 2014/0267021 A1 | 9/2014 | Lee et al. | |
| 2015/0268728 A1* | 9/2015 | Makela | G06F 3/011 |
| | | | 345/156 |
| 2015/0346932 A1 | 12/2015 | Nuthulapati | |
| 2017/0337476 A1 | 11/2017 | Gordon et al. | |
| 2018/0336332 A1* | 11/2018 | Singh | H04L 9/3215 |

OTHER PUBLICATIONS

International Search Report and Written Opinion from PCT/US2020/050002, dated Dec. 2, 2020, 17 pages.

\* cited by examiner

*Primary Examiner* — Nicholas R Wilson
(74) *Attorney, Agent, or Firm* — BakerHostetler

(57) ABSTRACT

Implementations of the subject technology provide determining an operating mode of an electronic device based at least in part on whether the electronic device is communicatively coupled to an associated base device. Based on the determined operating mode, the subject technology identifies a set of input modalities for initiating a recording of content within a field of view of the electronic device. The subject technology monitors sensor information generated by at least one sensor included in, or communicatively coupled to, the electronic device. Further, the subject technology initiates the recording of content within the field of view of the electronic device when the monitored sensor information indicates that at least one of the identified set of input modalities has been triggered.

20 Claims, 9 Drawing Sheets

MULTIMODAL INPUTS FOR COMPUTER-GENERATED REALITY

CROSS REFERENCE TO RELATED APPLICATIONS

This application claims the benefit of priority to U.S. Provisional Patent Application No. 62/897,909, entitled "Multimodal Inputs for Computer-Generated Reality," filed on Sep. 9, 2019, the disclosure of which is hereby incorporated herein in its entirety.

TECHNICAL FIELD

The present description relates generally to computer-generated reality environments, including utilizing multimodal inputs in computer-generated reality environments.

BACKGROUND

Augmented reality technology aims to bridge a gap between virtual environments and a physical environment by providing an enhanced physical environment that is augmented with electronic information. As a result, the electronic information appears to be part of the physical environment as perceived by a user. In an example, augmented reality technology further provides a user interface to interact with the electronic information that is overlaid in the enhanced physical environment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
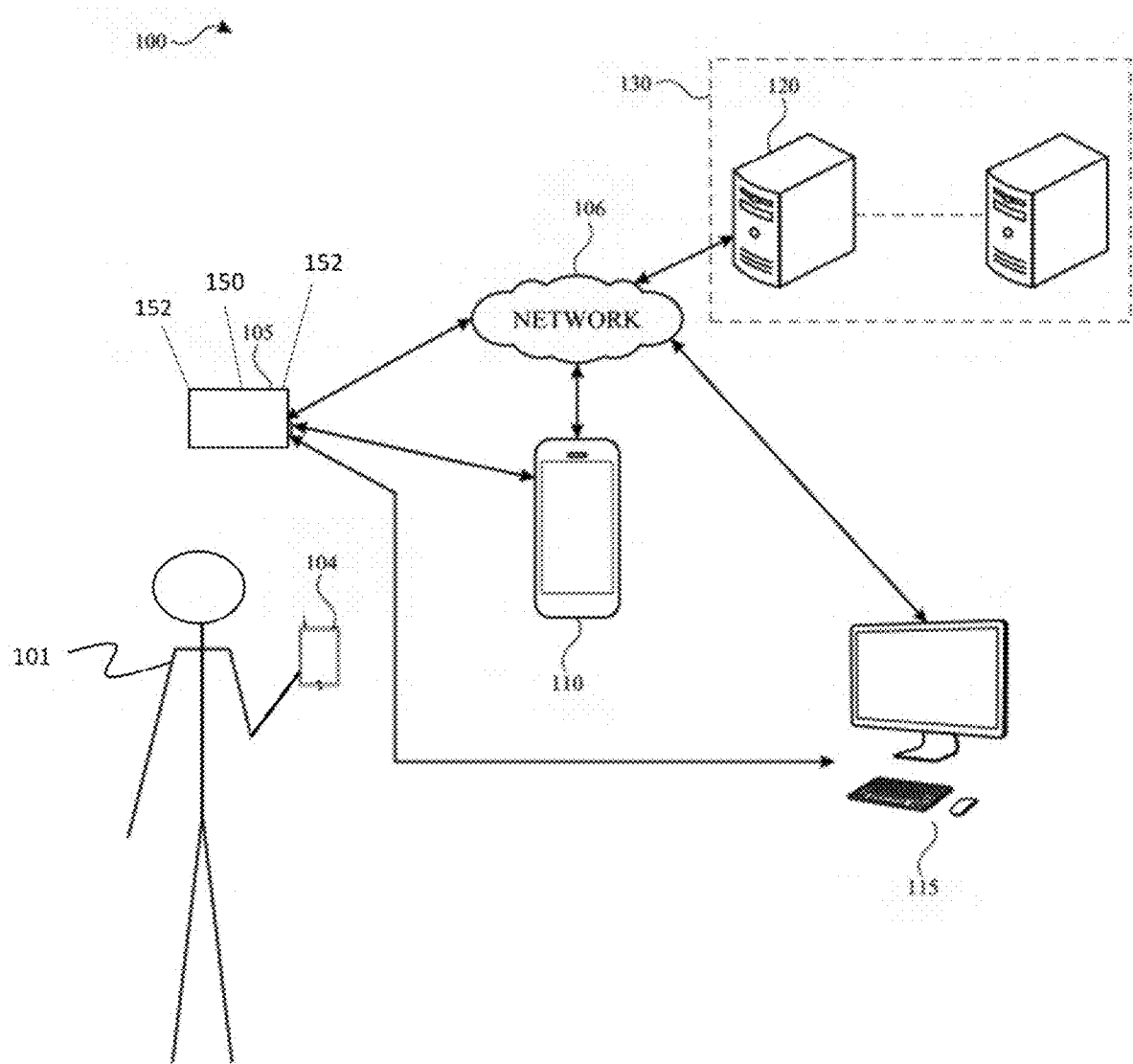
FIG. 1 illustrates an example system architecture including various electronic devices that may implement the subject system in accordance with one or more implementation.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A computer-generated reality (CGR) system enables physical and virtual environments to be combined in varying degrees to facilitate interactions from a user in a real-time manner. Such a CGR system, as described herein, therefore can include various possible combinations of physical and virtual environments, including augmented reality that primarily includes physical elements and is closer to a physical environment than a virtual environment (e.g., without physical elements). In this manner, a physical environment can be connected with a virtual environment by the CGR system. A user immersed in an CGR environment can navigate through such an environment and the CGR system can track the user's viewpoint to provide a visualization based on how the user is situated in the environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's body and/or head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and a virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over a portion of the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over a portion of the physical environment and/or behind a portion of the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include mobile devices, tablet devices, projection-based systems, heads-up displays (HUDs), head mounted systems, vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets or tablet devices, and desktop/laptop computers. For example, a head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide a CGR system that can enable multimodality using different input modalities for recording content within a CGR environment. Examples of different input modalities include facial expressions, gestures, speech, and/or explicit hardware input, each of which can work separately and/or in conjunction with one or more of the other input modalities. Consequently, the input modalities described herein can function in a complementary manner. Further, the subject technology enables selecting a region of interest in the CGR environment and providing annotations of objects and/or events detected in the CGR environments.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices, and any number of servers or a data center including multiple servers.

The electronic device 105 may be implemented, for example, as a tablet device, a handheld and/or mobile device, or as a head mounted portable system (e.g., worn by a user 101). The electronic device 105 includes a display system capable of presenting a visualization of a computer-generated reality environment to the user. The electronic device 105 may be powered with a battery and/or another power supply. In an example, the display system of the electronic device 105 provides a stereoscopic presentation of the computer-generated reality environment, enabling a three-dimensional visual display of a rendering of a particular scene, to the user. In one or more implementations, instead of, or in addition to, utilizing the electronic device 105 to access a computer-generated reality environment, the user may use a handheld electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User input detected by such sensors and/or hardware elements correspond to, for example, various input modalities for initiating a co-presence session from within an application. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc.

In one or more implementations, the electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the computer-generated reality environment may be offloaded to the base device thereby reducing processing burdens on the electronic device 105. For instance, in an implementation, the electronic device 105 works in conjunction with the electronic device 110 or the electronic device 115 to generate a computer-generated reality environment including physical and/or virtual objects that enables different forms of interaction (e.g., visual, auditory, and/or physical or tactile interaction) between the user and the generated computer-generated reality environment in a real-time manner. In an example, the electronic device 105 provides a rendering of a scene corresponding to the computer-generated reality environment that can be perceived by the user and interacted with in a real-time manner, such as a host environment for a co-presence session with another user. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the computer-generated reality environment. Examples of such events include detecting a presence of a particular person, entity, or object in the scene. In response to the detected event, the electronic device 105 can provide annotations (e.g., in the form of metadata) in the computer-generated reality environment corresponding to the detected event.

The network 106 may communicatively (directly or indirectly) couple, for example, the electronic device 104, the electronic device 105, the electronic device 110, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a computer-generated reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 9. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 9.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for computer-generated reality environments. In an implementation, the server 120 may function as a cloud storage server that stores any of the aforementioned computer-generated reality content generated by the above-discussed devices and/or the server 120.

Figure 2:
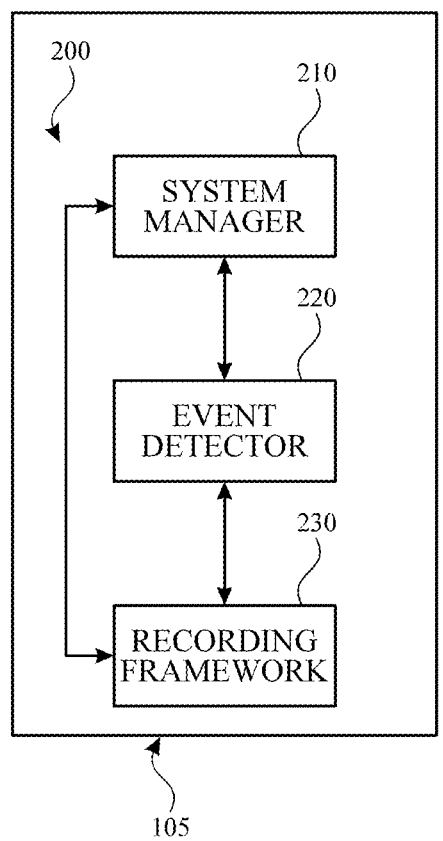
FIG. 2 illustrates an example software architecture that may be implemented on an electronic device in accordance with one or more implementations of the subject technology.

FIG. 2 illustrates an example software architecture 200 that may be implemented on an electronic device 105 in accordance with one or more implementations of the subject technology. For explanatory purposes, the software architecture 200 is described as being implemented by the electronic device 105 of FIG. 1, such as by a processor and/or memory of the electronic device 105; however, the software architecture 200 may be implemented by any other electronic device, including the electronic device 115 or the electronic device 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The software architecture 200, as implemented on the electronic device 105, includes a framework. A framework, as used herein, can refer to a software environment that provides particular functionality as part of a larger software platform to facilitate development of software applications, and may provide one or more application programming interfaces (APIs) that may be utilized by developers to design, in a programmatic manner, computer-generated reality environments and to handle operations for such computer-generated reality environments.

As illustrated, a recording framework 230 is provided. The recording framework 230 may provide functionality to record a computer-generated reality environment provided by the input modalities as discussed above. An event detector 220 is provided that receives information corresponding to input from the various input modalities. A system manager 210 is provided to monitor resources from the electronic device 105 and determine a quality of service metric based on available resources. The system manager 210 can make decisions for selecting particular hardware components, corresponding to respective input modalities, to activate and/or deactivate in view of the quality of service metric, such as to free processing resources, conserve power resources, and the like. For example, a camera for tracking facial expressions can be turned off, or another camera for tracking hand gestures can be turned off.

In one or more implementations, when particular hardware is deactivated, the electronic device 105 may provide a notification to alert the user that a particular input modality is unavailable. Similarly, the electronic device 105 may provide a notification to alert the user that a particular input modality is available upon activating particular hardware.

Figure 3A:
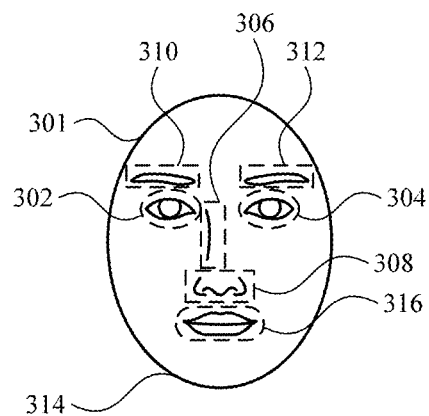
FIG. 3A illustrates an example of facial expression tracking to initiate computer-generated reality recording in accordance with implementations of the subject technology.

FIG. 3A illustrates an example of facial expression tracking to initiate computer-generated reality recording in accordance with implementations of the subject technology. The following discussion relates to components of the electronic device 105, which includes various cameras or image sensors to enable facial tracking of a user's face.

In an implementation, the electronic device 105 may utilize various sensors to track facial expressions by a user 301 using the electronic device 105. As shown, different regions within the user's face can be tracked by the sensors of the electronic device 105. For example, a camera may track movement of a right eyebrow 310 and a left eyebrow 312 of the user 301. Another camera may track movement of a region 302 including a right eye and a region 304 including a left eye. A different camera can track movement of a first region 308 (e.g., including the apex and nostrils of a nose) and/or a second region 306 (e.g., including the dorsum nasi and/or bridge of the nose). Yet another camera, can track a mouth 316 of the user 301. Further, a particular camera can track a lower jaw 314 including a chin of the user 301.

Although various cameras are discussed above, it is appreciated that a same camera can track more than one portion of the user's face and still be within the scope of the subject technology. For example, the same camera can be utilized track the user's lower jaw 314 and mouth 316 of the user 301.

Information from the various cameras can be independently analyzed or used in combination by the event detector 220. The event detector 220 can use this information to detect a facial expression from the user's face. In response to the detected facial expression, the event detector 220 can send a request to the recording framework 230 to initiate a recording within a computer-generated reality environment, e.g., of a particular region of interest or field of view.

Different types of facial expressions can correspond to various emotions of the user 301. In an example, the electronic device 105 determines that a detected facial expression corresponds to a particular emotion (e.g., surprise, anger, happiness) and initiates a recording of the computer-generated reality environment in response to an emotion based on the detected facial expression.

Figure 3B:
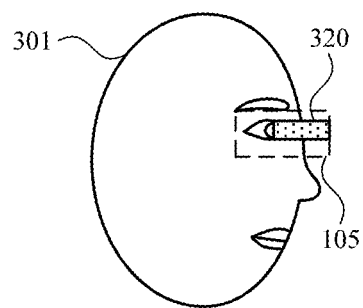
FIGS. 3B and 3C illustrate examples of tracking a gaze direction to initiate computer-generated reality recording in accordance with implementations of the subject technology.
Figure 3C:
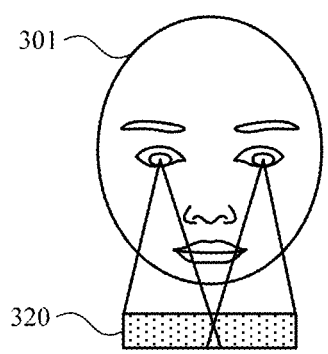

FIGS. 3B and 3C illustrate examples of tracking a gaze direction to initiate computer-generated reality recording in accordance with implementations of the subject technology. The following discussion relates to components of the electronic device 105, which includes various cameras to enable tracking a gaze direction of eyes of a user's face.

As shown in FIG. 3B, images are captured by at least one camera of the electronic device 105 are analyzed to determine the relative positions of the user's eyes within a field of view. In an implementation, the electronic device 105 can differentiate the user's pupils, and can utilize the relative position of the pupils with respect to the eye position to determine a gaze direction. For example, in FIG. 3C, the electronic device 105 can use the detected position of the user's pupils relative to the user's eyes, and determine an area on the display of the electronic device 105 at which the user is looking within the field of view 320. Additionally, in an implementation, the electronic device 105 can also detect movements such as a user closing his or her eyes for a particular period of time, which may be used to initiate recording within the computer-generated reality environment.

The event detector 220 can analyze information mentioned above to determine a gaze direction. The event detector 220 can use this information to determine a gaze direction of the user's eyes. In response to the determined gaze direction, the event detector 220 can send a request to the recording framework 230 to initiate a recording within a computer-generated reality environment. For example, in response to determining that the gaze direction of the user is in a particular direction or toward a particular object or person in the current scene of the computer-generated reality environment, the event detector 220 can send such a request to the recording framework 230 to initiate a recording.

Figure 4A:
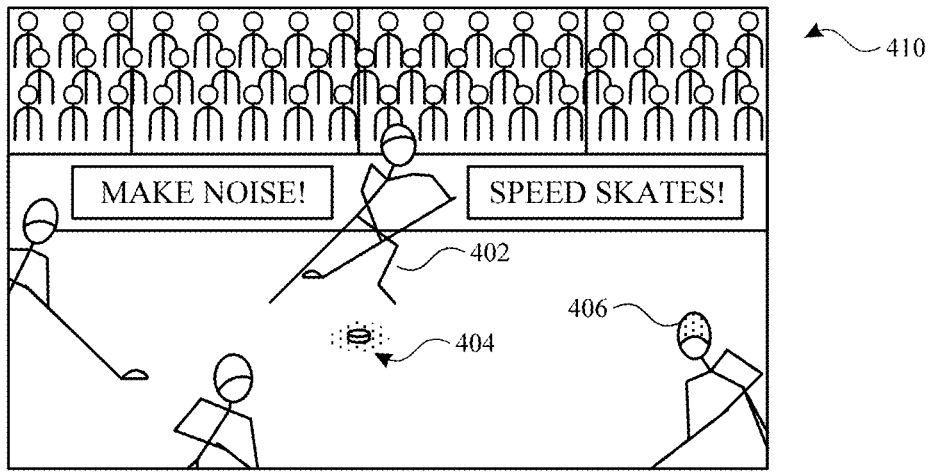
FIGS. 4A, 4B, and 4C illustrate examples of determining a region of interest within a computer-generated reality environment and initiating a recording based on the region of interest in accordance with some implementations of the subject technology.
Figure 4B:
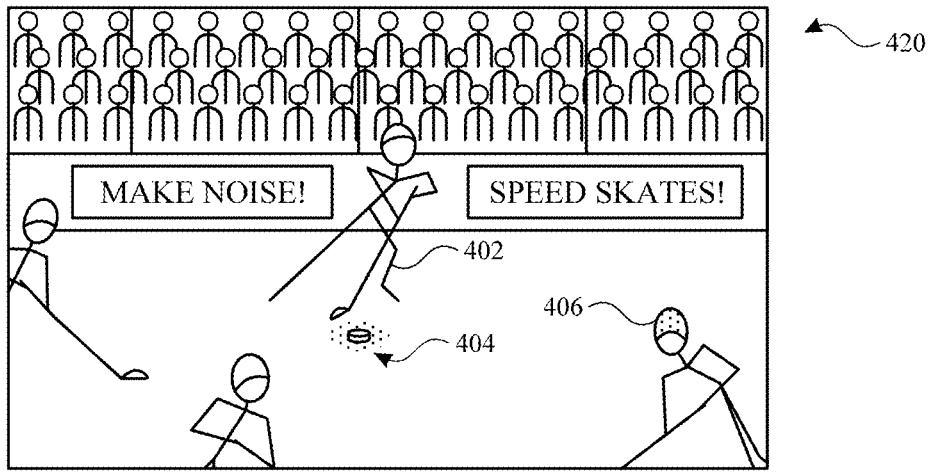
Figure 4C:
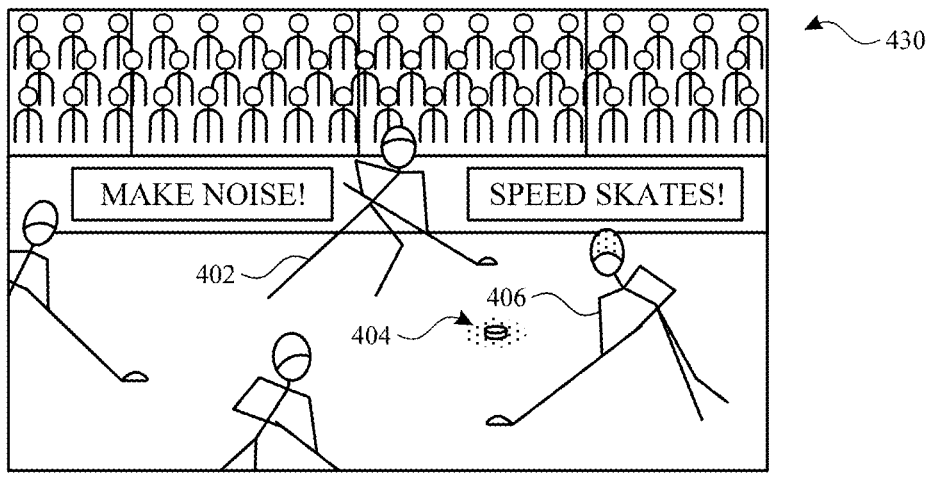

FIGS. 4A, 4B, and 4C illustrate examples of determining a region of interest within a computer-generated reality environment and initiating a recording based on the region of interest in accordance with some implementations of the subject technology. The following discussion relates to components of the electronic device 105.

In an implementation, one or more input modalities may be used to identify a region of interest which is to be a focus of a recording within the computer-generated reality environment. For example, a user can perform a gesture or some other interaction (e.g., pushing a button or switch on the electronic device 105, providing a hotword or speech) to identify a region of interest. It is also appreciated that the user may utilize one or more input modalities in combination in order to identify the region of interest and/or initiate the recording. Further, as discussed above, the recording may be initiated upon detection of an event that occurs within the scene such as a presence of a person in the scene.

As illustrated in FIG. 4A, a scene 410 shows a sporting event (e.g., hockey game) that is occurring in a computer-generated reality environment. In this example, through using a particular input modality, the user has selected a region of interest 404 corresponding to a hockey puck in the current scene of the computer-generated reality environment. In the scene 410, the hockey puck is moving toward a person 402 corresponding to a first hockey player. The event detector 220 has detected a presence of a particular person 406 (e.g., a star hockey player) and, in response, initiates recording of the computer-generated reality environment by sending a request to the recording framework 230.

In FIG. 4B, a scene 420 shows that the particular person 406 has moved to a different position than originally in the scene 410. The recording framework 230 continues the recording of the computer-generated reality environment and focuses on the region of interest 404 as the hockey puck moves closer to the hockey stick of the person 402 in the scene 420. Thus, the region of interest 404 can move, or be in motion, and the recording moves, or tracks, the region of interest. In an implementation, the recording framework 230 records the entirety of the scene 420 notwithstanding the region of interest 404. During future playback of the recording, the presentation of the recording may be focused on the region of interest 404 corresponding to the hockey puck.

In FIG. 4C, a scene 430 shows that the particular person 406 moves to a different position than in the scene 420 and is fully in a frame of view of the scene 430. The recording framework 230 continues the recording of the computer-generated reality environment and focuses on the region of interest 404 as the hockey puck moves across the ice rink in the scene 430.

Figure 5A:
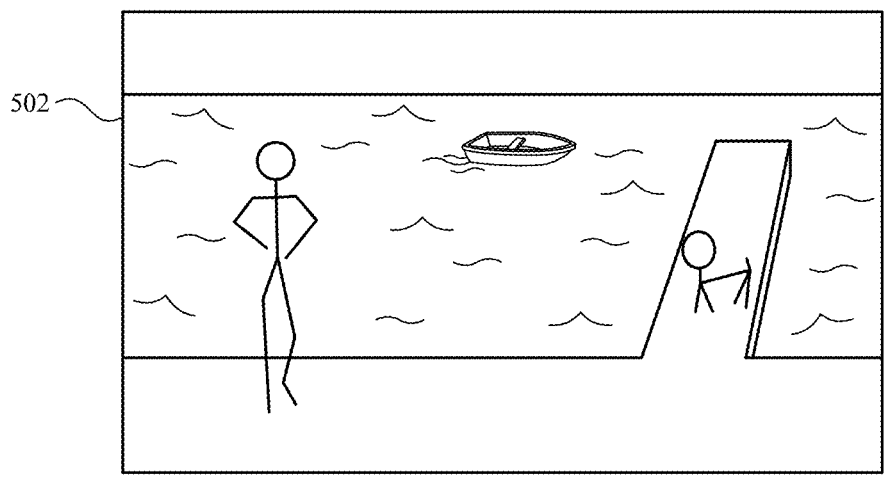
FIGS. 5A, 5B, and 5C illustrate examples of providing annotations to various objects or entities within a computer-generated reality environment in accordance with some implementations of the subject technology.
Figure 5B:
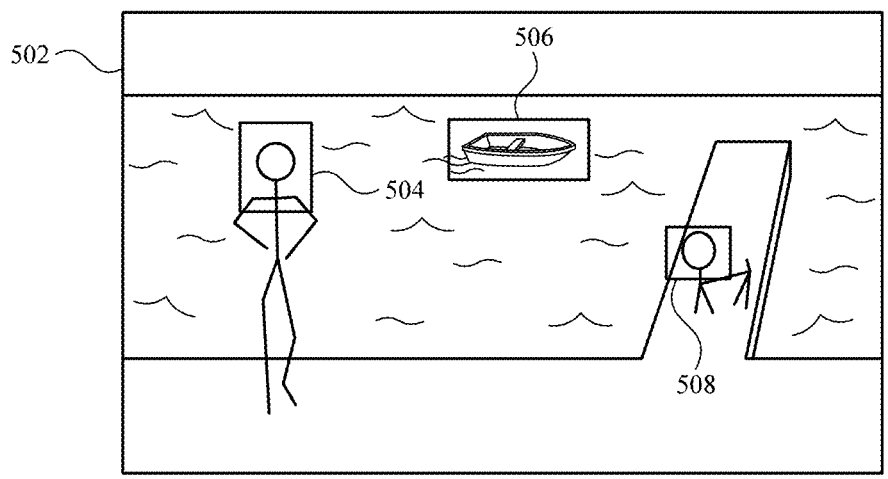
Figure 5C:
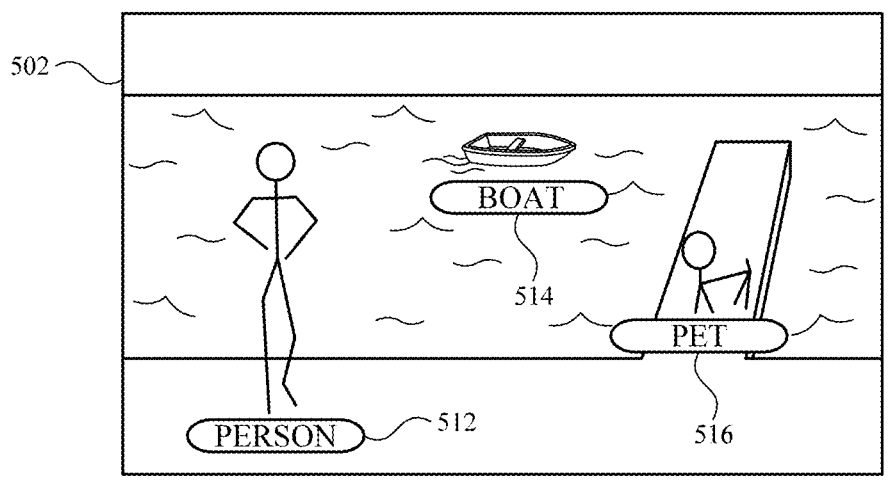

FIGS. 5A, 5B, and 5C illustrates examples of providing annotations to various objects or entities within a computer-generated reality environment in accordance with some implementations of the subject technology. The following discussion relates to components of the electronic device 105.

In FIG. 5A, a scene 502 is rendered to the user and includes various objects or entities within the computer-generated reality environment. In FIG. 5B, the event detector 220 detects the presence of a person 504, an animal 508, and a vehicle 506. In an example, detection of objects occurs when the recorded video stream is passed to the event detector 220. The event detector 220 forwards information corresponding to the detected person 504, animal 508, and vehicle 506 to the recording framework 230. Based on the received information, the recording framework 230 generates an annotation 512 corresponding to the person 504. The recording framework 230 also generates an annotation 514 corresponding to the vehicle 506. Further, the recording framework 230 generates annotation 516 corresponding to the animal 508. Alternatively, the event detector 220 can generate the aforementioned annotations and the recording framework 230 can store the annotations as metadata with coordinates (and/or other information) that correspond to the annotation. The aforementioned annotations may be stored as metadata associated with the recording of content of the scene such as, in an example, adding the metadata to be included as part of the recording of content (e.g., a modified version of the recording of content that now includes the metadata). In an example, objects are identified and recognized as the person, animal, etc., and the metadata is stored in association with the identified objects. In an implementation, such metadata corresponding to the annotations may be stored in memory of the electronic device 105, and/or included in a computer-generated reality recording, and/or stored separately in a different electronic device(s) (e.g., a server or base device). It is further appreciated that different sets of annotations may be applied to a given computer-generated reality recording thereby enabling various uses of different annotations in connection with playback of the recording.

In FIG. 5C, the electronic device 105 renders an update to the scene 502 which now shows the annotation 512 corresponding to the person 504, the annotation 514 corresponding to the vehicle 506, and the annotation 516 corresponding to the animal 508. As illustrated, the annotations are rendered as part of the scene 502 which may include elements corresponding to physical environment that are mixed with digitally generated content (e.g., the annotations). In some implementations, such annotations may be provided in different formats or not displayed in the scene. For example, the annotations may be provided to a user in audio form, serving as a narration to the computer-generated reality environment that the user is currently experiencing.

Figure 6:
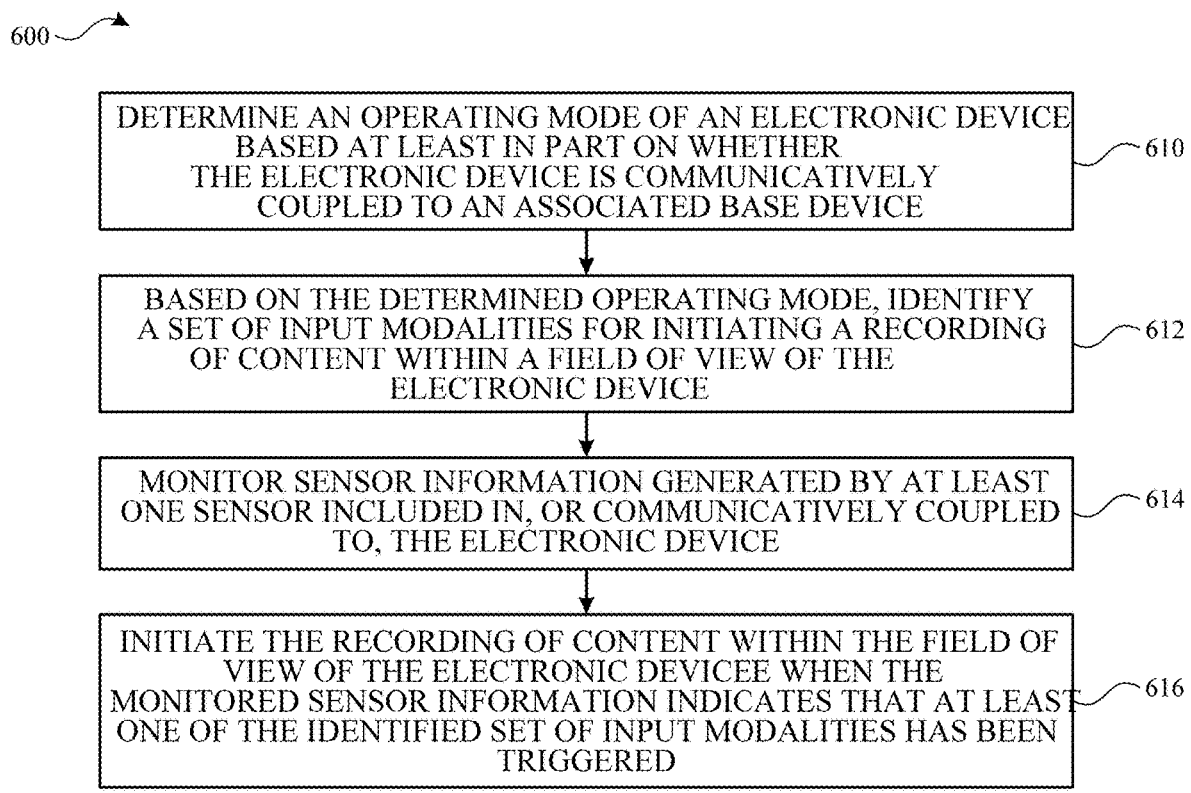
FIG. 6 illustrates a flow diagram of an example process for initiating a recording of content within a field of view of an electronic device.

FIG. 6 illustrates a flow diagram of an example process 600 for initiating a recording of content within a field of view of an electronic device 105 in accordance with one or more implementations. For explanatory purposes, the process 600 is primarily described herein with reference to the electronic device 105 of FIGS. 1 and 2. However, the process 600 is not limited to the electronic device 105 of FIGS. 1 and 2, and one or more blocks (or operations) of the process 600 may be performed by one or more other components of other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As illustrated in FIG. 6, the electronic device 105 determines an operating mode based at least in part on whether the electronic device 105 is communicatively coupled to an associated base device (610). Based on the determined operating mode, the electronic device 105 identifies a set of input modalities for initiating a recording of content within a field of view of the electronic device 105 (612). The electronic device 105 monitors sensor information generated by at least one sensor included in, or communicatively coupled to, the electronic device 105 (614). The electronic device 105 initiates the recording of content within the field of view of the electronic device 105 when the monitored sensor information indicates that at least one of the identified set of input modalities has been triggered (616).

Figure 7:
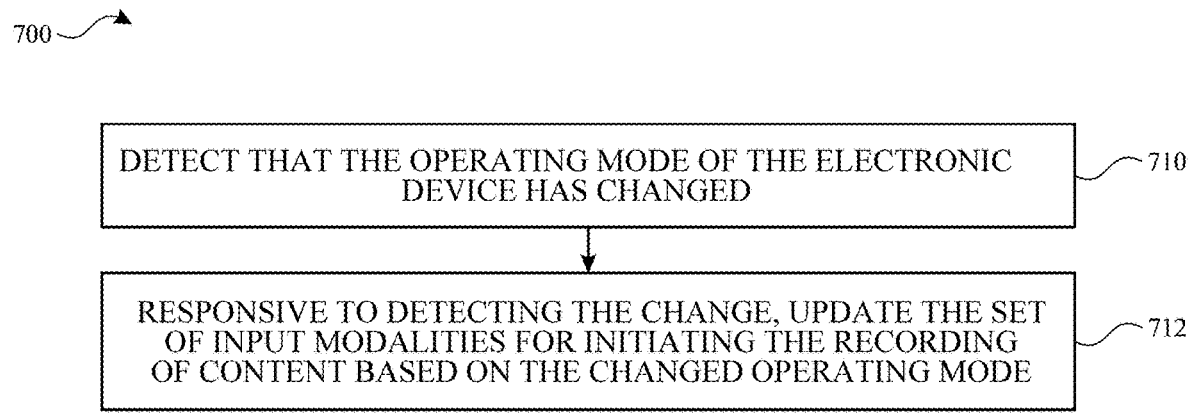
FIG. 7 illustrates a flow diagram of an example process for updating a set of input modalities for initiating a recording of content on the electronic device in accordance with one or more implementations.

FIG. 7 illustrates a flow diagram of an example process 700 for updating a set of input modalities for initiating a recording of content on the electronic device 105 in accordance with one or more implementations. For explanatory purposes, the process 700 is primarily described herein with reference to the electronic device 105 of FIGS. 1 and 2. However, the process 700 is not limited to the electronic device 105 of FIGS. 1 and 2, and one or more blocks (or operations) of the process 700 may be performed by one or more other components of other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

As illustrated in FIG. 7, the electronic device 105 detects that the operating mode of the electronic device 105 has changed (710). Responsive to detecting the change, the electronic device 105 updates the set of input modalities for initiating the recording of content based on the changed operating mode (712).

Figure 8:
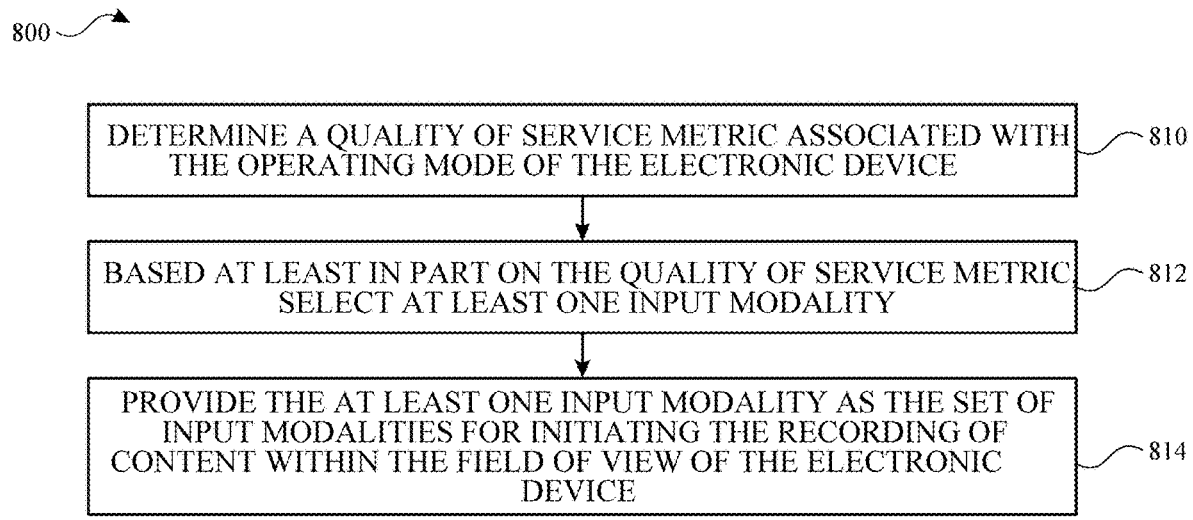
FIG. 8 illustrates a flow diagram of an example process for determining a quality of service metric associated with the operating mode of the electronic device in accordance with one or more implementations.

FIG. 8 illustrates a flow diagram of an example process 800 for determining a quality of service metric associated with the operating mode of the electronic device 105 in accordance with one or more implementations.

As illustrated in FIG. 8, the electronic device 105 determines a quality of service metric associated with the operating mode of the electronic device 105 (810). The electronic device 105, based at least in part on the quality of service metric, selects at least one input modality (812). The electronic device 105 provides the at least one input modality as the set of input modalities for initiating the recording of content within the field of view of the electronic device 105 (814).

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 9:
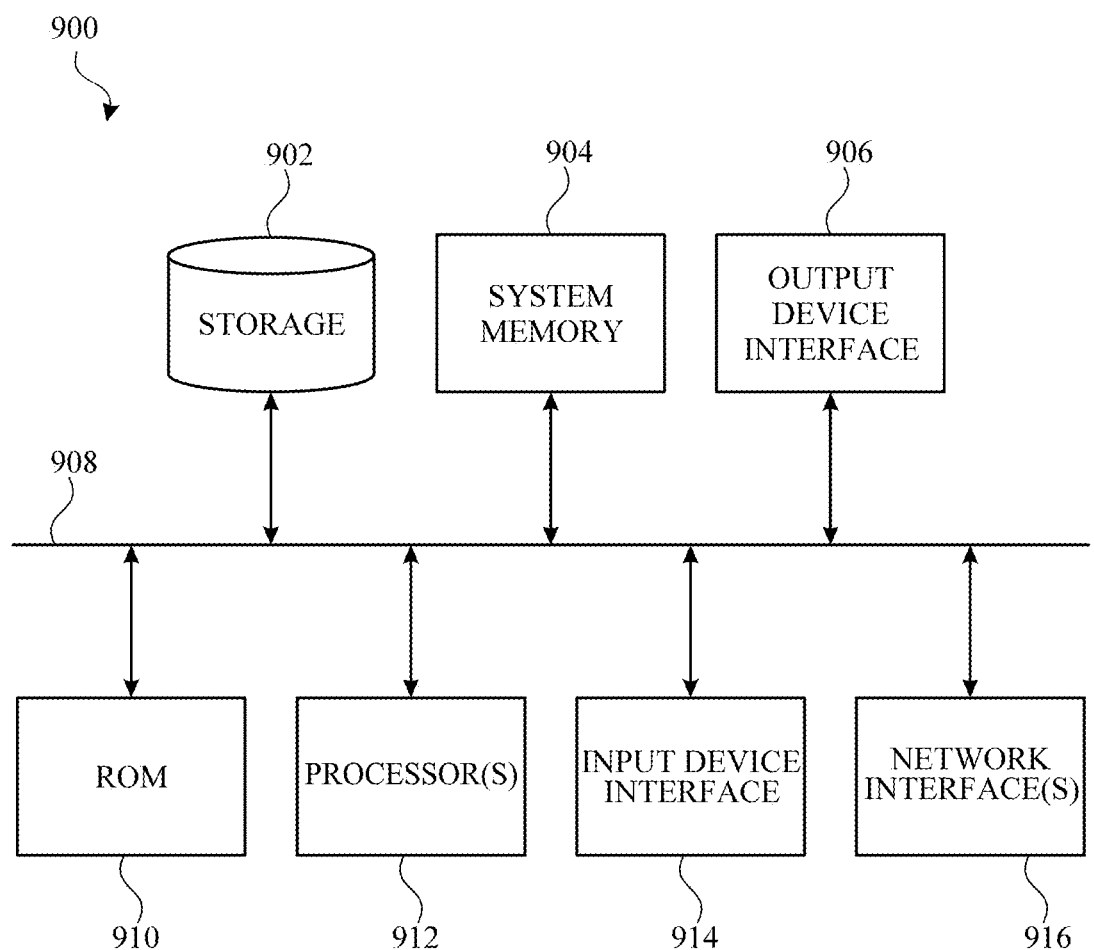
FIG. 9 illustrates an electronic system with which one or more implementations of the subject technology may be implemented.

FIG. 9 illustrates an electronic system 900 with which one or more implementations of the subject technology may be implemented. The electronic system 900 can be, and/or can be a part of, the electronic device 105, the electronic device 104, the electronic device 110, the electronic device 115, and/or the server 120 as shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the electronic device 110 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method comprising:
   determining an operating mode of an electronic;
   when the operating mode is determined to be a first operating mode, selecting a first set of input modalities for initiating a recording of content within a field of view of the electronic device, and when the operating mode is determined to be a second operating mode, selecting a second set of input modalities for initiating the recording of content within the field of view of the electronic device, the second set of input modalities differing from the first set of input modalities;
   monitoring sensor information generated by at least one sensor included in, or communicatively coupled to, the electronic device; and
   initiating the recording of content within the field of view of the electronic device when the monitored sensor information indicates that at least one of the first selected set of input modalities has been triggered when the operating mode is determined to be the first operating mode or that at least one of the second selected set of input modalities has been triggered when the operating mode is determined to be the second operating mode.

2. The method of claim 1, further comprising:
   detecting that the operating mode of the electronic device has changed; and
   responsive to detecting the change, updating the set of input modalities for initiating the recording of content based on the changed operating mode.

3. The method of claim 1, wherein the associated base device corresponds to a mobile computing device, a laptop, or a desktop computer.

4. The method of claim 1, wherein identifying the set of input modalities for initiating the recording of content further comprises:
   determining a quality of service metric associated with the operating mode of the electronic device;
   based at least in part on the quality of service metric, selecting at least one input modality; and
   providing the at least one input modality as the set of input modalities for initiating the recording of content within the field of view of the electronic device.

5. The method of claim 4, wherein the quality of service metric is based at least in part on available computing resources, or available power in the electronic device, the available power including an amount of battery power.

6. The method of claim 4, further comprising:
   deactivating a particular input modality corresponding to at least one sensor in the electronic device, wherein the particular input modality comprises a facial expression, gaze direction, eye position, hand gesture, hardware input, speech, or identification of an object or person in a scene.

7. The method of claim 4, further comprising:
   deactivating a particular sensor in the electronic device when the quality of service metric falls below a threshold value, wherein the particular sensor comprises a camera, an inertial measurement unit, a microphone, or a touch sensor.

8. The method of claim 1, further comprising:
   determining a region of interest in the field of view of the electronic device.

9. The method of claim 8, wherein the region of interest is determined based on a gesture or an indicator corresponding to the region of interest.

10. The method of claim 1, further comprising:
    generating an annotation corresponding to the recording of content; and
    adding the annotation as metadata to the recording of content.

11. A system comprising;
    a processor;
    a memory device containing instructions, which when executed by the processor cause the processor to perform operations comprising:
    determining an operating mode of an electronic device;
    when the operating mode is determined to be a first operating mode, identifying a first set of input modalities for initiating a recording of content within a field of view of the electronic device, and when the operating mode is determined to be a second operating mode, identifying a second set of input modalities for initiating the recording of content within the field of view of the electronic device, the second set of input modalities differing from the first set of input modalities;

monitoring sensor information generated by at least one sensor included in, or communicatively coupled to, the electronic device; and initiating the recording of content within the field of view of the electronic device when the monitored sensor information indicates that at least one of the first identified set of input modalities has been triggered when the operating mode is determined to be the first operating mode or that at least one of the second identified set of input modalities has been triggered when the operating mode is determined to be the second operating mode.

12. The system of claim 11, wherein the memory device contains further instructions, which when executed by the processor further cause the processor to perform further operations further comprising:

detecting that the operating mode of the electronic device has changed; and responsive to detecting the change, updating the set of input modalities for initiating the recording of content based on the changed operating mode.

13. The system of claim 11, wherein the associated base device corresponds to a mobile computing device, a laptop, or a desktop computer.

14. The system of claim 11, wherein identifying the set of input modalities for initiating the recording of content further causes the processor to perform further operations further comprising:

determining a quality of service metric associated with the operating mode of the electronic device;

based at least in part on the quality of service metric, selecting at least one input modality; and providing the at least one input modality as the set of input modalities for initiating the recording of content within the field of view of the electronic device.

15. The system of claim 14, wherein the quality of service metric is based at least in part on available computing resources, or available power in the electronic device, the available power including an amount of battery power.

16. The system of claim 14, wherein the memory device contains further instructions, which when executed by the processor further cause the processor to perform further operations further comprising:

deactivating a particular input modality corresponding to at least one sensor in the electronic device, wherein the particular input modality comprises a facial expression, gaze direction, eye position, hand gesture, hardware input, speech, or identification of an object or person in a scene.

17. The system of claim 14, wherein the memory device contains further instructions, which when executed by the processor further cause the processor to perform further operations further comprising:

deactivating a particular sensor in the electronic device when the quality of service metric falls below a threshold value, wherein the particular sensor comprises a camera, an inertial measurement unit, a microphone, or a touch sensor.

18. The system of claim 11, wherein the memory device contains further instructions, which when executed by the processor further cause the processor to perform further operations further comprising:

determining a region of interest in the field of view of the electronic device, wherein the region of interest is determined based on a gesture or an indicator corresponding to the region of interest.

19. The system of claim 11, wherein the memory device contains further instructions, which when executed by the processor further cause the processor to perform further operations further comprising:

generating an annotation corresponding to the recording of content; and adding the annotation as metadata to the recording of content.

20. A non-transitory computer-readable medium comprising instructions, which when executed by a computing device, cause the computing device to perform operations comprising:

determining an operating mode of an electronic device;

based on the determined operating mode, identifying a set of input modalities for initiating a recording of content within a field of view of the electronic device;

monitoring sensor information generated by at least one sensor included in, or communicatively coupled to, the electronic device;

initiating the recording of content within the field of view of the electronic device when the monitored sensor information indicates that at least one of the identified set of input modalities has been triggered;

detecting that the operating mode of the electronic device has changed; and responsive to detecting the change, updating the set of input modalities for initiating the recording of content based on the changed operating mode.

* * * * *